(12) United States Patent
Balram et al.

(10) Patent No.: US 7,889,940 B2
(45) Date of Patent: Feb. 15, 2011

(54) FILM GRAIN GENERATION AND ADDITION

(75) Inventors: Nikhil Balram, Mountain View, CA (US); Bharat Pathak, Bangalore (IN); Uma Jayaraman, Koramangala (IN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 12/642,440

(22) Filed: Dec. 18, 2009

(65) Prior Publication Data
US 2010/0166335 A1     Jul. 1, 2010

Related U.S. Application Data

(63) Continuation of application No. 11/313,577, filed on Dec. 20, 2005, now Pat. No. 7,664,337.

(51) Int. Cl.
*G06K 9/40* (2006.01)

(52) U.S. Cl. .................... 382/254; 348/622; 358/447

(58) Field of Classification Search ................. 382/100, 382/254, 255, 263, 275; 348/606–631; 358/1.9–3.31, 358/447, 461, 463
See application file for complete search history.

(56) References Cited

U.S. PATENT DOCUMENTS

| | | | | |
|---|---|---|---|---|
| 5,831,673 | A | | 11/1998 | Przyborski et al. |
| 5,875,003 | A | * | 2/1999 | Kato et al. ................. 348/699 |
| 6,055,340 | A | * | 4/2000 | Nagao .......................... 382/261 |
| 6,373,992 | B1 | * | 4/2002 | Nagao .......................... 382/266 |
| 7,432,986 | B2 | * | 10/2008 | Winger ......................... 348/625 |
| 7,719,618 | B2 | * | 5/2010 | Winger ......................... 348/625 |
| 2007/0070241 | A1 | | 3/2007 | Boyce et al. |
| 2008/0152250 | A1 | | 6/2008 | Gomila et al. |

\* cited by examiner

*Primary Examiner*—Anand Bhatnagar

(57) ABSTRACT

High-frequency noise is generated that approximates the appearance of traditional "film grain" for a digital video signal. By adding a relatively small amount of film grain noise, the video can be made to look more natural and more pleasing to the human viewer. The digital film grain generation can be used to mask unnatural smooth artifacts in digital video such as "blockiness" and "contouring" in the case of compressed video and/or used to provide visual enhancements or special effects to any digital video stream. The digital film grain generator can control grain size and the amount of film grain to be added.

20 Claims, 5 Drawing Sheets

FILM GRAIN GENERATION AND ADDITION

CROSS REFERENCE TO RELATED APPLICATION

This is a continuation of co-pending, commonly assigned U.S. patent application Ser. No. 11/313,577 filed Dec. 20, 2005, which is incorporated by reference herein in its entirety.

FIELD OF THE INVENTION

The present invention relates generally to image and video processing, and more particularly to film grain generation in image signals.

BACKGROUND OF THE INVENTION

The amount of memory required to store an uncompressed 90-minute long moving picture feature film (i.e., movie) is often around 90 Gigabytes. However, DVD media typically has a storage capacity of 4.7 Gigabytes. Accordingly, storing the complete movie onto a single DVD requires compression ratios of the order of 20:1. The data is further compressed to accommodate audio on the same storage media. By using the MPEG2 compression standard, for example, it is possible to achieve the relatively high compression ratios. However, when the movie is decoded and played back compression artifacts like "blockiness" and "mosquito noise" are often visible.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
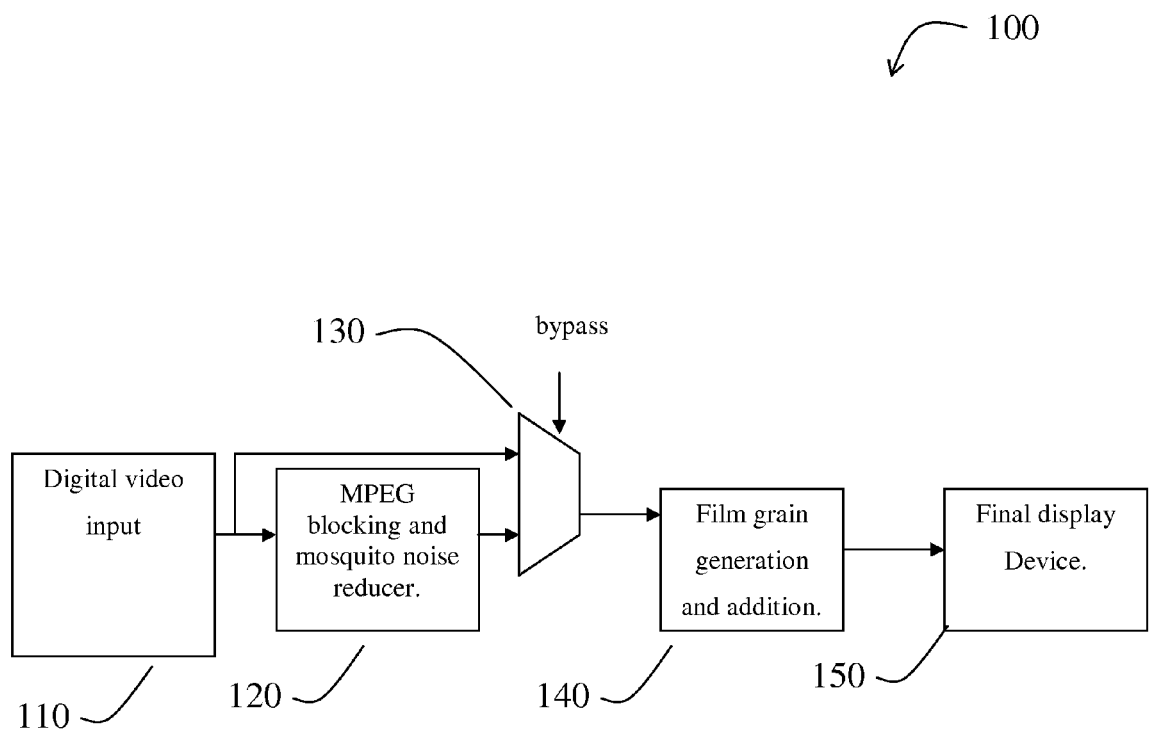
FIG. 1 is a block diagram of an example film grain generation system.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views. The present invention can be embodied in a system such as described in U.S. patent application Ser. No. 11/296,185, entitled "Color Management Unit", filed Dec. 7, 2005, which is hereby incorporated by reference.

The present invention is directed towards generating high-frequency noise that approximates the appearance of traditional "film grain" for a digital video signal. By adding a relatively small amount of film grain noise, the video can be made to look more natural and more pleasing to the human viewer. The digital film grain generation can be used to mask unnatural smooth artifacts in digital video such as "blockiness" and "contouring" in the case of compressed video and/or used to provide visual enhancements or special effects to any digital video stream. The digital film grain generator can control grain size and the amount of film grain to be added.

Various cinematographers have commented that film produces a more aesthetically pleasing look than digital video, even when very high-resolution digital sensors are used. This "film look" has sometimes been described as being more "creamy and soft" in comparison to the more "harsh" look of digital video. This aesthetically pleasing property of film results (at least in part) from the randomly occurring, continuously moving high frequency film grain (as compared to the fixed pixel grid of a digital sensor). Accordingly, generating high-frequency noise that has the visual property of "film grain" can be used to mask unnatural smooth artifacts like "blockiness" and "contouring" in the case of compressed video. Moreover, simply adding the film grain-like high-frequency noise can provide a visual enhancement or special effect to any digital video stream.

Certain in-loop and post-processing algorithms can be used to reduce "blockiness" and "mosquito noise." In the process of compression, de-compression and removal of artifacts, a video signal can often lose a natural-looking appearance and instead can acquire a "patchy" appearance. By adding a relatively small amount of film grain noise, the video can be made to look more natural and more pleasing to the human viewer. Addition of film grain noise can also provide a slight textured look to patchy looking areas of the image.

FIG. 1 is a block diagram of an example film grain generation system. Film grain generation system 100 comprises a digital video source (110), an optional MPEG blocking and mosquito noise reducer (120), an optional multiplexer (130), film grain generator (140), and a final display device (150). The digital video source can be an MPEG decoder for decoding MPEG-encoded data on a DVD. The decoded stream (in digital format) is fed to MPEG blocking and mosquito noise reducer 120. The MPEG noise reducer is provided to reduce blocking and mosquito noise artifacts present in the decoded stream. The noise-reduced data is then fed to the film grain generator (140). The bypass path shows that the film grain data can also be added directly to the MPEG decoded data. In the bypass mode of operation, the film grain data can still be added to the decoded stream, which also works to create the effect of masking the blocking artifacts.

In an embodiment, film grain noise is added to the luminance data path while MPEG noise reduction processing is also occurring on luminance data path. To compensate for the additional processing delays, the chrominance data path can be accordingly delay balanced (to maintain synchronization of chroma and luma information, for example). In alternate embodiments, film grain generation could also be added to the chrominance path. As shown in the Figure, the input to film grain generator 140 can thus comprise luminance and/or chrominance information.

To help control the degree of film grain generation (to optimize the aesthetic quality of any given digital video stream, for example), attributes (such as the grain size and the amount of film grain that needs to be added) of film grains can be controlled.

Figure 2:
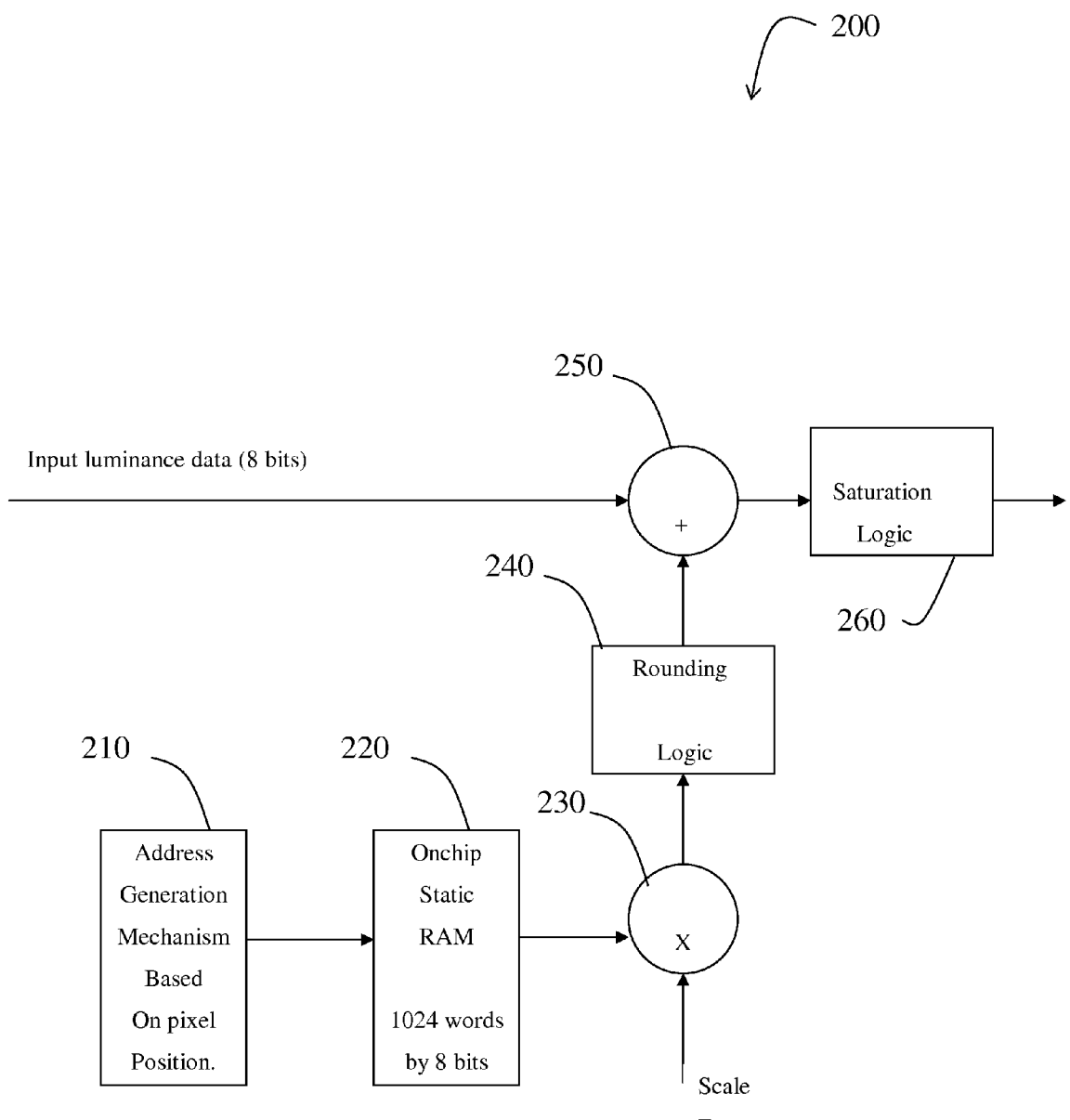
FIG. 2 is a block diagram of an example film grain generator and mechanism to add film grain data to incoming video data.

FIG. 2 is a block diagram of an example film grain generator and example adder for adding film grain data to the incoming Y data (e.g., luminance data). Film grain generator 200 comprises address generator 210, memory 220, scaler 230, rounding logic 240, summing node 250, and saturation logic 260. In various embodiments, the incoming data to the film grain addition module could come from MPEG noise reducer block (120) or directly input (110) such as from an MPEG decoder integrated into the same system or located remotely. Film grain data can be initially written into memory 220 by means of a host processor. (Generation of film grain data is discussed below with respect to FIG. 3.) Memory 220 can be on-chip static RAM such that a customer can supply user-specified film grain entries and have the flexibility to change the entries at a later time.

Address generator 210 accesses memory 220 to provide film grain data stored in the static RAM. The film grain data can be derived using a 2D (two-dimensional) data mask of size 32×32. The 2D mask data in the memory can be stored in 1D (one-dimensional) format by mapping each incoming pixel maps to a unique address in the memory, and computing an address by running horizontal and vertical counters. The counters can cycle in response to control signals (hde and vde). A formula for addressing of memory 220 is given by Equation (1) as follows:

$$sram\_address = 32 \times (vcount \text{ modulo } 32) + (hcount \text{ modulo } 32) \quad (1)$$

In response to a pixel position, a corresponding entry is selected from the memory and added (at summing node 250) to the incoming pixel value after appropriate scaling by scaler 230. The film grain entries in the static RAM can be either positive or negative and can range from −127 to 127.

Apart from film grain data from memory (which provides information about film grain size), a mechanism is used to control how much amount of film grain noise needs to be added. To achieve this, a multiplier (e.g., scaler 230) is used that has a first input of film grain data and a second input of a scale factor, which can be programmed via register. The bit precision of scale factor is (for example) "1.7" such that the scale factor comprises one integer bit and seven fractional bits. After scaling the film grain data, the multiplier output is in 9.7 bit format. The 9.7 bit format is converted to 8.0 bit format by means of rounding by rounding logic 240.

The scaled and rounded entries are added to the incoming pixel at summing node 250. With the addition of controlled film grain noise (which can be both positive and negative) to the incoming Y data (with 8 bits of precision in the example) care is taken such that data overflow and underflow does not occur. Saturation (or clipping-clamping) logic 260 can be used to minimize undesired data overflow and underflow issues.

The film grain data or mask generation is typically an offline process. The generation can be accomplished using a commonly available mathematics programs such as "Matlab." To design two-dimensional high pass filter (hpf) filter coefficients, certain functions that are available in the mathematics program Matlab were used in the example.

Figure 3:
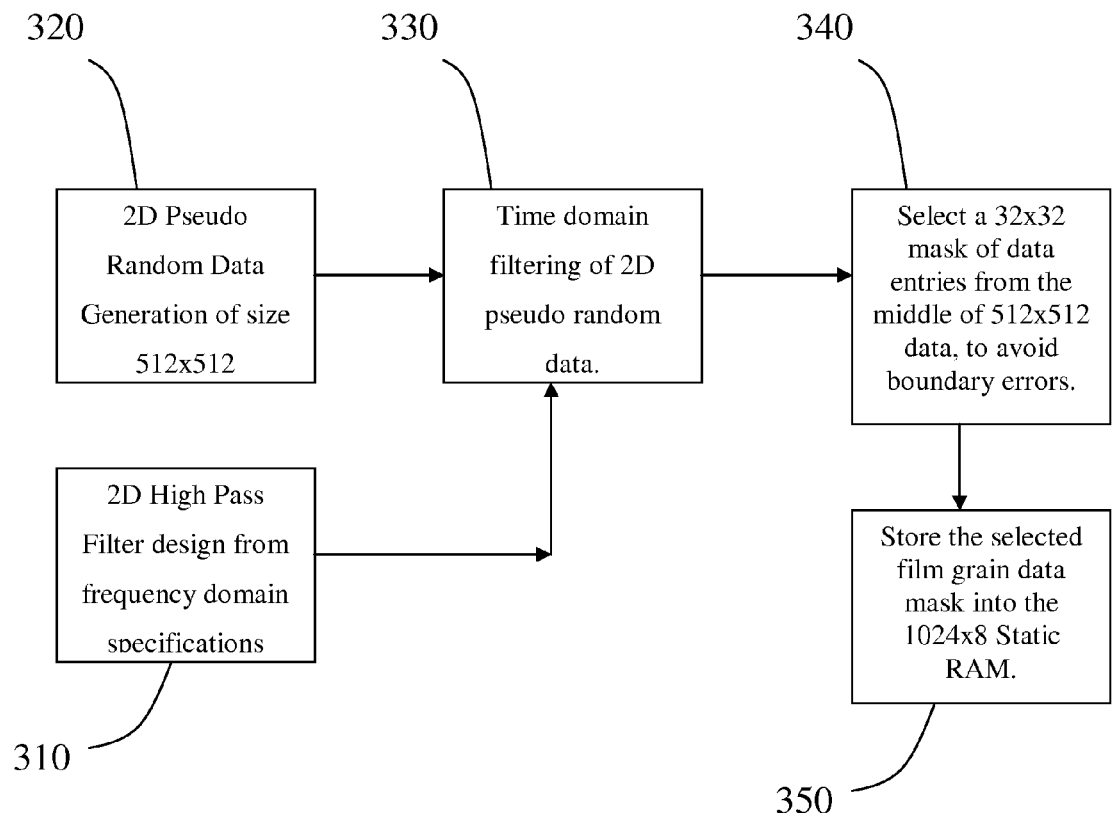
FIG. 3 is a flow graph illustrating example processing steps for mask data generation for a film grain generator.

FIG. 3 is a flow graph illustrating example processing steps for mask data generation. In step 310, a one-dimensional filter was designed from the frequency specifications. The one-dimensional filter is transformed to a two-dimensional set of coefficients using a function called "ftrans2." The specifications used to design the example high pass filter are given below in Table 1. The user can vary the pass band frequency specifications to achieve different sizes of film grain. In the example, the film grain size will be large if the spatial sampling frequency is small (and small if the spatial sampling frequency is large).

TABLE 1

| Parameter | Specification | Units |
| --- | --- | --- |
| Spatial sampling frequency (Fs) | 512 | Cycles/Width |
| Stop band frequency (fs) | 0.1 * Fs | Cycles/Width |
| Pass band frequency (fp) | 0.5 * Fs | Cycles/Width |
| Pass band ripple (Ap) | 0.01 | Decibel |
| Stop band attenuation (As) | 60 | Decibel |

With the frequency specifications listed in Table 1, the one dimensional filter is sixth order and has seven coefficients overall. The (Matlab) function "ftrans2" is used to transform the one-dimensional filter into a two-dimensional circularly symmetric filter. The set of coefficients for the two-dimensional circularly symmetric filter is listed below in Table 2.

TABLE 2

|  | Hc0 | Hc1 | Hc2 | Hc3 | Hc4 | Hc5 | Hc6 |
| --- | --- | --- | --- | --- | --- | --- | --- |
| Vc0 | −0.0003 | −0.0017 | −0.0042 | −0.0057 | −0.0042 | −0.0017 | −0.0003 |
| Vc1 | −0.0017 | 0.0027 | 0.0263 | 0.0437 | 0.0263 | 0.0027 | −0.0017 |
| Vc2 | −0.0042 | 0.0263 | −0.0537 | −0.1685 | −0.0537 | 0.0263 | −0.0042 |
| Vc3 | −0.0057 | 0.0437 | −0.1685 | 0.5642 | −0.1685 | 0.0437 | −0.0057 |
| Vc4 | −0.0042 | 0.0263 | −0.0537 | −0.1685 | −0.0537 | 0.0263 | −0.0042 |
| Vc5 | −0.0017 | 0.0027 | 0.0263 | 0.0437 | 0.0263 | 0.0027 | −0.0017 |
| Vc6 | −0.0003 | −0.0017 | −0.0042 | −0.0057 | −0.0042 | −0.0017 | −0.0003 |

At step 320, a 512-word by 512-word two-dimensional matrix of pseudo-random (or "random") data is generated. At step 330, the data is applied to a two-dimensional filter (as specified in step 310). The two-dimensional filter applies a high pass shaping function to the incoming data as described below in FIG. 4.

Figure 4:
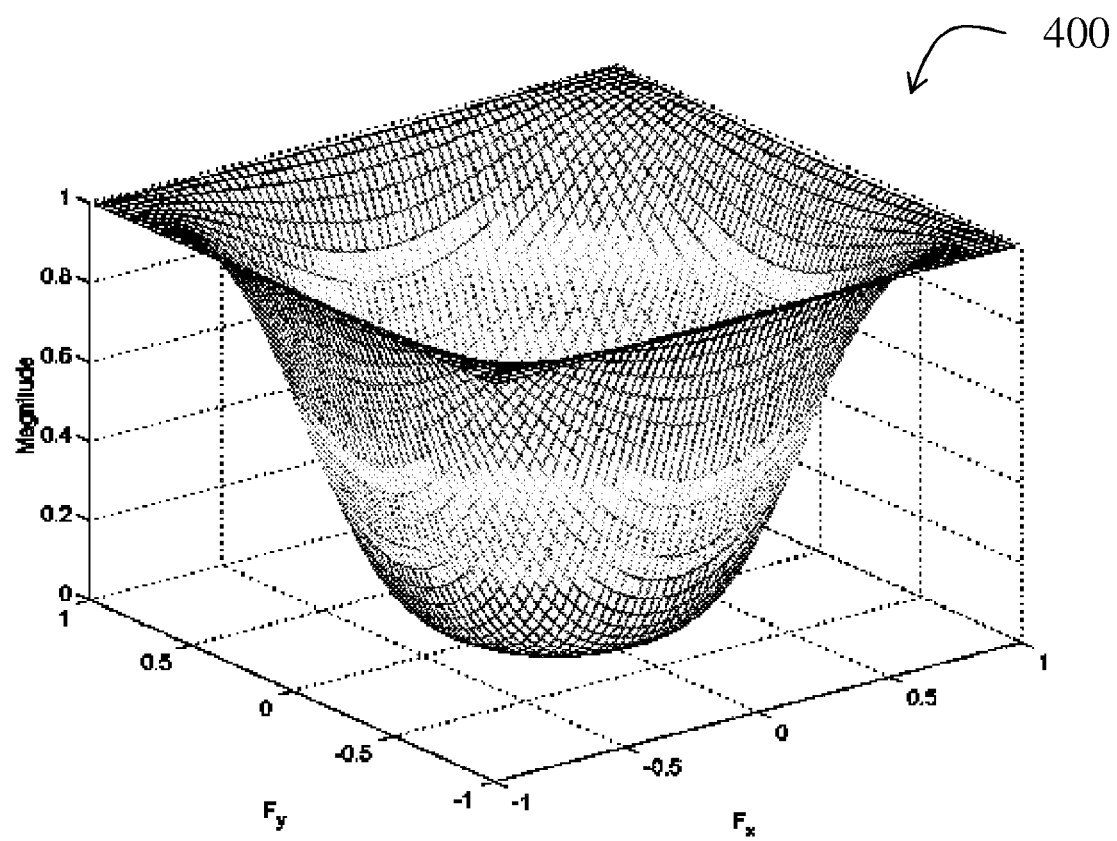
FIG. 4 is a graph illustrating the frequency response of an example high pass filter for filtering pseudo-random data for film grain generation.

FIG. 4 is a graph illustrating the frequency response (magnitude response) of an example high pass filter. Plot 400 demonstrates a filter that is circularly symmetric with respect to the origin and that offers a high pass shaping function to the incoming data. The pseudo-random data, which has flat frequency spectrum, is thus modified in accordance with the high pass filter transfer function.

Referring again to FIG. 3, a 32-word by 32-word mask of data entries is selected in step 340 from the middle of the 512-word by 512-word filtered data set. The middle of the set is selected for the purpose of minimizing boundary errors in the filtered data. At step 350, the selected film grain data mask is stored, for example, into a 1024×8 bit static RAM such that film grain data stored in the static ram can be retrieved at a later time for combination with an image data stream.

Figure 5:
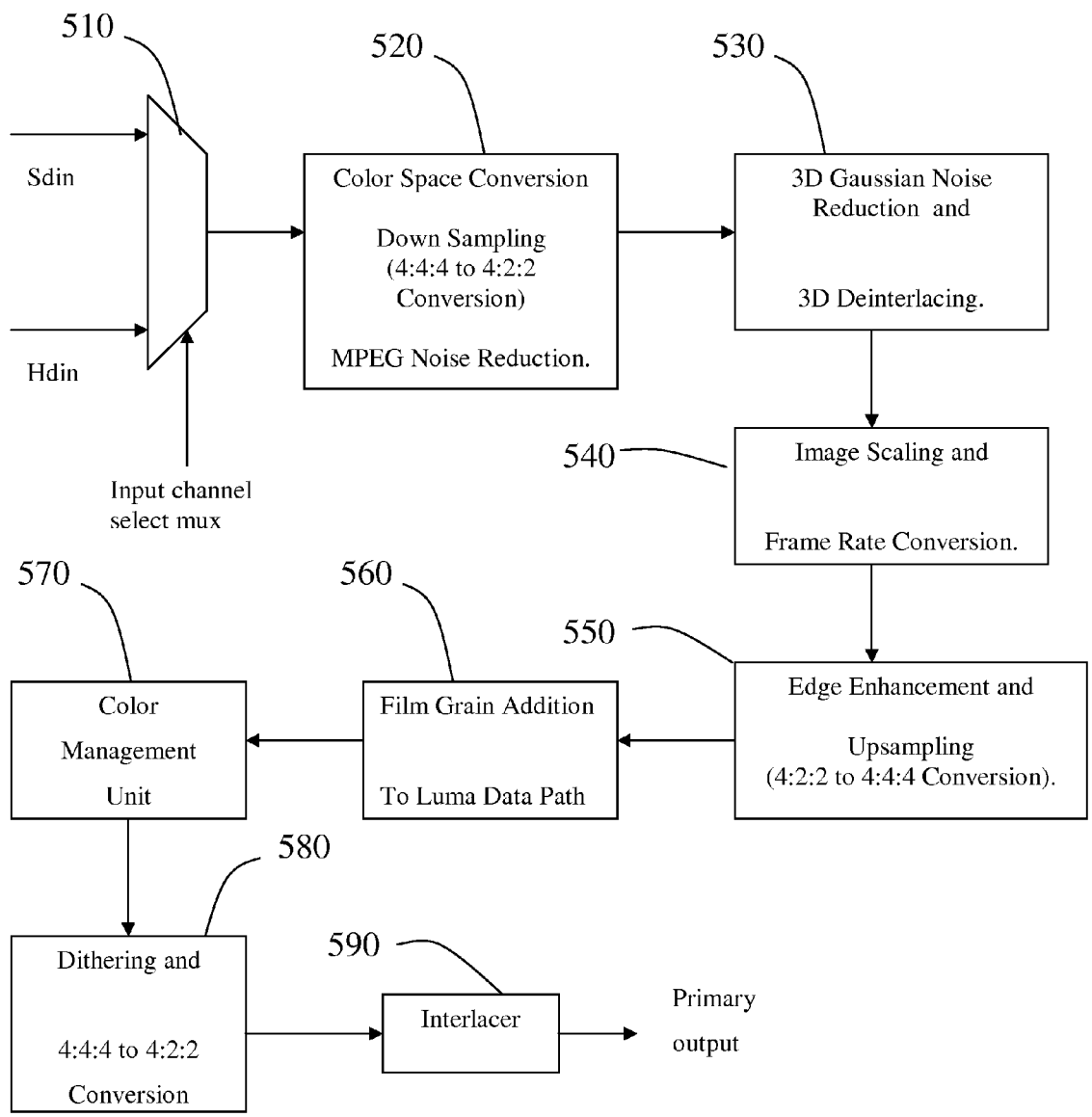
FIG. 5 is a simplified block diagram illustrating a film grain generator in an example video processing circuit implemented in an integrated circuit.

FIG. 5 is a simplified block diagram illustrating a film grain generator in an example video processing circuit implemented in an integrated circuit. For simplicity, the modules of the figure are illustrated as having more than one functionality within in single module. (In various embodiments the functionalities can be implemented using single modules, or even be distributed across several modules.) Additionally, the various modules in the Figure have bypass functionality, such that the functions within a module can be bypassed so that processing that is not desired for an application can be bypassed.

Module 510 permits selection of a video data stream from between, for example, standard definition video (NTSC or PAL) or high definition. Module 520 implements color space conversion and can down sample the video input stream. Module 520 can also optionally provide MPEG noise reduction. Module 530 can be used to provide three-dimensional Gaussian noise reduction and be further used to de-interlace image frames. Module 540 can be used to scale image frames within the video signal and provide frame rate conversion. Module 550 can be used to perform edge enhancement in the video signal while also performing up-sampling duties.

Film grain generation can be performed in Module 560 such that the film grain is added to the luminance portion of the video signal being processed. Module 570 provides color processing functions such as color enhancement and preservation. Module 580 can be used to dither (and down-sample) output video data for displays that, for example, have lower resolution than the output video data. Module 590 can be used to interlace frames associated with the output video data, if desired.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

We claim:

1. A method for providing film grain to a digital image frame, comprising:
   receiving a pixel associated with the digital image frame of an incoming video data stream;
   using a high pass filter, generating a mask of noise values independent of the incoming video data stream, wherein the mask represents film grain;
   selecting an entry from the mask of noise values; and
   combining the selected entry with the received pixel whereby film grain is added to the digital image frame to produce a grained digital image frame.

2. The method of claim 1, wherein the selected entry is combined with a luminance signal that is associated with the received pixel.

3. The method of claim 1, wherein the incoming video data stream contains image information that has been decompressed.

4. The method of claim 1, wherein the high pass filter is a two-dimensional filter.

5. The method of claim 4, wherein a film grain size is controlled by changing coefficients of the two-dimensional filter.

6. The method of claim 1, wherein an amount of film grain to be combined is selected in response to a scaling factor.

7. The method of claim 1, wherein the combined selected entry and received pixel comprise a value that is bounded by a minimum threshold and a maximum threshold.

8. The method of claim 1 further comprising mapping a horizontal position and a vertical position of the pixel within the digital image frame to an address of the mask of noise values.

9. A system for providing film grain to a digital image frame, comprising:
   an input that is configured to receive a pixel associated with the digital image frame of an incoming video data stream;
   a high pass filter that is configured to generate a mask of noise values independent of the incoming video data stream, wherein the mask represents film grain;
   a mask memory that is configured store the mask of noise values that represent film grain;
   circuitry configured to select an entry from the mask memory; and
   circuitry configured to combine the selected entry with the received pixel whereby film grain is added to the digital image frame to produce a grained digital image frame.

10. The system of claim 9, wherein the selected entry is combined with a luminance signal that is associated with the received pixel.

11. The system of claim 9, wherein the incoming video data stream contains image information that has been decompressed.

12. The system of claim 9, wherein the high pass filter is a two-dimensional filter.

13. The system of claim 12, wherein a film grain size is controlled by changing coefficients of the two-dimensional filter.

14. The system of claim 9, wherein an amount of film grain to be combined is selected in response to a scaling factor.

15. The system of claim 9, wherein the combined selected entry and received pixel comprise a value that is bounded by a minimum threshold and a maximum threshold.

16. The system of claim 9 further comprising an address generator that is configured to map a horizontal position and a vertical position of the pixel within the digital image frame to an address in the mask memory.

17. A system for providing film grain to a digital image frame, comprising:
   means for receiving a pixel associated with the digital image frame of an incoming video data stream;
   means for, using a high pass filter, generating a mask of noise values independent of the incoming video data stream, wherein the mask represents film grain;
   means for selecting an entry from the mask of noise values; and
   means for combining the selected entry with the received pixel whereby film grain is added to the digital image frame to produce a grained digital image frame.

18. The system of claim 17, wherein the selected entry is combined with a luminance signal that is associated with the received pixel.

19. The system of claim 17, wherein the incoming video data stream contains image information that has been decompressed.

20. The system of claim 17, wherein the high pass filter is a two-dimensional filter.

* * * * *